United States Patent [19]
Tatsu et al.

[11] Patent Number: 5,031,925
[45] Date of Patent: Jul. 16, 1991

[54] KEYLESS CHUCK FOR ROTARY TOOL

[75] Inventors: Kunihiko Tatsu; Masao Torigoe, both of Hikone, Japan

[73] Assignee: Matsushita Electric Works, Ltd., Osaka, Japan

[21] Appl. No.: 328,260

[22] Filed: Mar. 24, 1989

[30] Foreign Application Priority Data

Mar. 28, 1988 [JP] Japan .................. 63-73706
Jul. 5, 1988 [JP] Japan .................. 63-167291

[51] Int. Cl.⁵ .................................. B23B 31/10
[52] U.S. Cl. ............................ 279/64; 279/60; 279/1 K
[58] Field of Search ................ 279/60–64, 279/113, 1 K

[56] References Cited

U.S. PATENT DOCUMENTS

| 3,970,323 | 7/1976 | Schnizler, Jr. ............... | 279/64 |
| 4,213,623 | 7/1980 | Röhm ............................ | 279/64 X |
| 4,302,021 | 11/1981 | Röhm ............................ | 279/60 |
| 4,456,271 | 6/1984 | Kern et al. ................... | 279/1 B X |
| 4,695,065 | 9/1987 | Komatsu et al. .............. | 279/60 |

Primary Examiner—Larry I. Schwartz
Assistant Examiner—Robert Schultz
Attorney, Agent, or Firm—Armstrong, Nikaido, Marmelstein, Kubovcik & Murray

[57] ABSTRACT

A keyless chuck for a rotary tool comprises a chuck body which is adapted to be coupled at its one end to a drive spindle of a drive source and coupled at the other end to a tool bit for establishing a driving connection from the drive source to the tool bit. Relatively rotatable to the chuck body is a sleeve ring which is operatively connected to a set of gripping jaws for tightening the gripping jaws on the tool bit upon being rotated in one direction and loosening the same upon being rotated in the opposite direction. A one-way clutch is provided to rotatively fix the sleeve ring to the chuck body when the chuck body is driven to rotate in the direction of turning the tool bit reversely. A handle ring is disposed around the sleeve ring to be rotatable relative thereto within a limited extent such that it disengages said one-way clutch when said handle ring is rotated in one direction within said limited extent relative to said chuck body, allowing said chuck body to rotate freely from said sleeve ring to loosen said gripping jaws.

5 Claims, 6 Drawing Sheets

KEYLESS CHUCK FOR ROTARY TOOL

BACKGROUND OF THE INVENTION

1. Field of the Invention

The present invention is directed to a keyless chuck adapted to releasably hold a tool bit such as a drill bit of a power drill or the like rotary power tools, and more particularly to a chuck for rotary power tools capable of reversely rotating the tool bit.

2. Description of the Prior Art

Keyless chucks are known in the art in which a set of gripping jaws are tightened on a tool bit by manipulating a handle ring to rotate independently of a driving connection from a drive source to the tool bit. Such handle ring is generally located around a chuck body which carries the gripping jaws and is adapted to be coupled to a drive spindle of the drive source for establishing the driving connection. The handle ring is rotatable around the chuck body and is operatively connected to the gripping jaws in such a way as to tighten and loosen the same on the tool bit upon being selectively rotated relative to the chuck body. The handle ring is coupled to the chuck body by a one-way clutch which acts to rotatively fix the handle ring to the chuck for preventing the handle ring from counter-rotating in the direction of loosening the gripping jaws when the chuck body is driven to rotate in the reverse direction, thus enabling to turning the tool bit reversely without disengaging the tool bit from the gripping jaws. Further, the one-way clutch allows the handle ring to rotate relative to the chuck body in the direction of tightening the gripping jaws until the gripping jaws are tightened on the tool bit to be rotatable therewith, whereby enabling a self-tightening of the gripping jaws on the tool bit. When removing or disengaging the tool bit from the gripping jaws, the one-way clutch is required to be shifted to a release position of disengaging the handle ring from the chuck body, permitting the handle ring to rotate freely from the chuck body to loosen the gripping jaws. To this end, prior chucks have been devised to provide a separate release ring for disengaging the clutch to loosen the gripping jaws, in addition to the handle ring utilized to tighten the gripping jaws, as seen in U.S. Pat. No. 4,302,021. However, such separate provision of the handle ring and the release ring is found inconvenient and requires a complicated assembly with an attendant increase in the number of parts employed. To overcome this problems, U.S. Pat. No. 4,695,065 assigned to the same assignee of the subject application discloses to use a single handle ring for tightening and loosing the gripping jaws. However, in this patent, the handle ring is required to be shifted axially for releasing the clutch and then be manipulated to rotate in a given direction to loosen the gripping jaws out of the tool bit. In this sense, the chuck of the patent also requires a rather complicated manipulation and is therefore found not to be satisfactory in providing a simple or instinctive loosening operation of releasing the clutch and disengaging the tool bit from the gripping jaws.

SUMMARY OF THE INVENTION

The above problems are eliminated by the present invention which provides an improved keyless chuck having a handle ring which is easy to be manipulated for removing a tool bit therefrom. The keyless or self-tightening chuck in accordance with the present invention comprises a chuck body having a longitudinal axis and adapted to be connected to a drive spindle of a drive source for rotation about the axis. The chuck body is drivingly connected to a set of gripping jaws releasably holding a tool bit to be driven to rotate about the axis in either direction. A sleeve ring is rotatably disposed around the chuck body and is operatively connected to the gripping jaws. The sleeve ring is rotatable with respect to the chuck body for displacing the gripping jaws into tool-gripping relation with the tool bit when the chuck body is driven to rotate in the forward direction relative to the sleeve ring and displacing the gripping jaws out of tool-gripping relation from the tool bit when the chuck body is driven to rotate in the reverse direction relative to the sleeve ring.

A one-way clutch is provided to rotatively fix the sleeve ring to the chuck body when the chuck body is driven to rotate in the reverse direction in order to rotate the sleeve ring together with the chuck body without loosening the gripping jaws and to allow the chuck body to rotate in the forward direction independently of the sleeve ring until the chuck body is rotated to tighten the grip jaws on the tool bit, after which the chuck body rotates in the same direction together with the sleeve ring for driving the tool bit to rotate in the forward direction. In this manner, the chuck enables a self-tightening operation of gripping the tool bit by rotating the chuck body in the forward direction relative to the sleeve ring, yet preventing the gripping jaws from being loosened when it is driven to rotate in the reverse direction and assuring to successfully turning the tool bit reversely while holding it firmly by the gripping jaws.

The handle ring is disposed around the sleeve ring and is rotatable relatively thereto within a limited extent such that it releases the one-way clutch to disengage the sleeve ring from the chuck body when the handle ring is rotated in one direction within the limited extent relative to the chuck body, allowing the chuck body to rotate freely from the sleeve ring to loosen the gripping jaws for removal of the tool bit therefrom. Accordingly, the clutch release can be made simply by rotating the handle ring relative to the sleeve ring or the chuck body without requiring any additional complicated manipulation, after which the handle ring is allowed to continuously rotate together with the sleeve ring relative to the chuck body just disengaged therefrom for loosening the gripping jaws and removal of the tool bit. This enables a self-loosening of the tool bit by energizing the power tool to rotate the chuck body reversely with the handle ring held stationary by one hand of a user.

It is therefore a primary object of the present invention to provide an improved keyless chuck in which the clutch release and the subsequent loosening of the tool bit can be made in an instinctive manner of simply rotating the handle ring relative to the chuck body.

In preferred embodiments, the one-way clutch comprises a pawl pivotally supported by the sleeve ring about a pivot axis and biased by a spring into locking engagement with ratchet teeth formed around the chuck body. With this spring bias the sleeve ring can be normally held in stable locking engagement with the chuck body to prevent an accidental disengagement of the sleeve ring from the chuck body, assuring a reliable chuck operation, which is therefore another object of the present invention.

These and other objects and advantageous features of the present invention will become apparent from the following description of the preferred embodiments when taken in conjunction with the attached drawings.

DETAILED DESCRIPTION OF THE PREFERRED EMBODIMENTS

First embodiment <FIGS. 1 to 5>

Referring to FIGS. 1 to 5, there is shown a keyless chuck for a rotary tool in accordance with a first preferred embodiment of the present invention. The chuck is adapted for use in a rotary power tool such as a drill or screwdriver capable of reversing its rotating direction. The chuck comprises a chuck body 10 adapted to be coupled to a drive spindle 1 of the power tool (not shown), a set of gripping jaws 20 for releasably holding a suitable tool bit 3 to be driven by the chuck body 10 to rotate in either direction, and a handle ring 30 for tightening the gripping jaws 20 on the shank of the tool bit 3. The chuck body 10 is in the form of a hollow cylinder having a longitudinal axis about which it is driven to rotate by the drive spindle 1. Extending axially rearwardly of the chuck body 10 is an integral coupling boss 11 of non-circular outer configuration into which the drive spindle 1 extends for threaded engagement therewith. For firm connection of the drive spindle 1 to the chuck body 10, a fastener 5 is threaddedly inserted into a head socket 2 in the drive spindle 1 with a collar 6 held between the head of the fastener 5 and the coupling boss 11.

Figure 1:
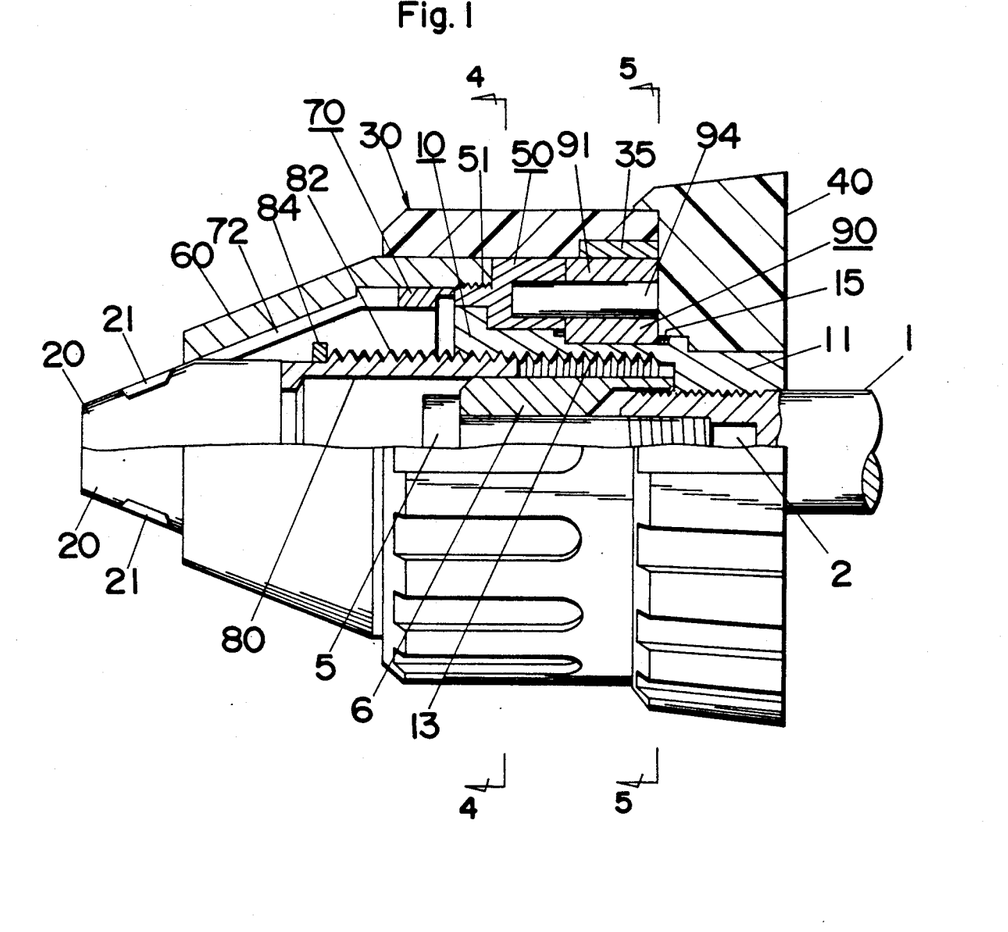
FIG. 1 is a front view partly in section of a keyless chuck in accordance with a first embodiment of the present invention.
Figures 2, 3:
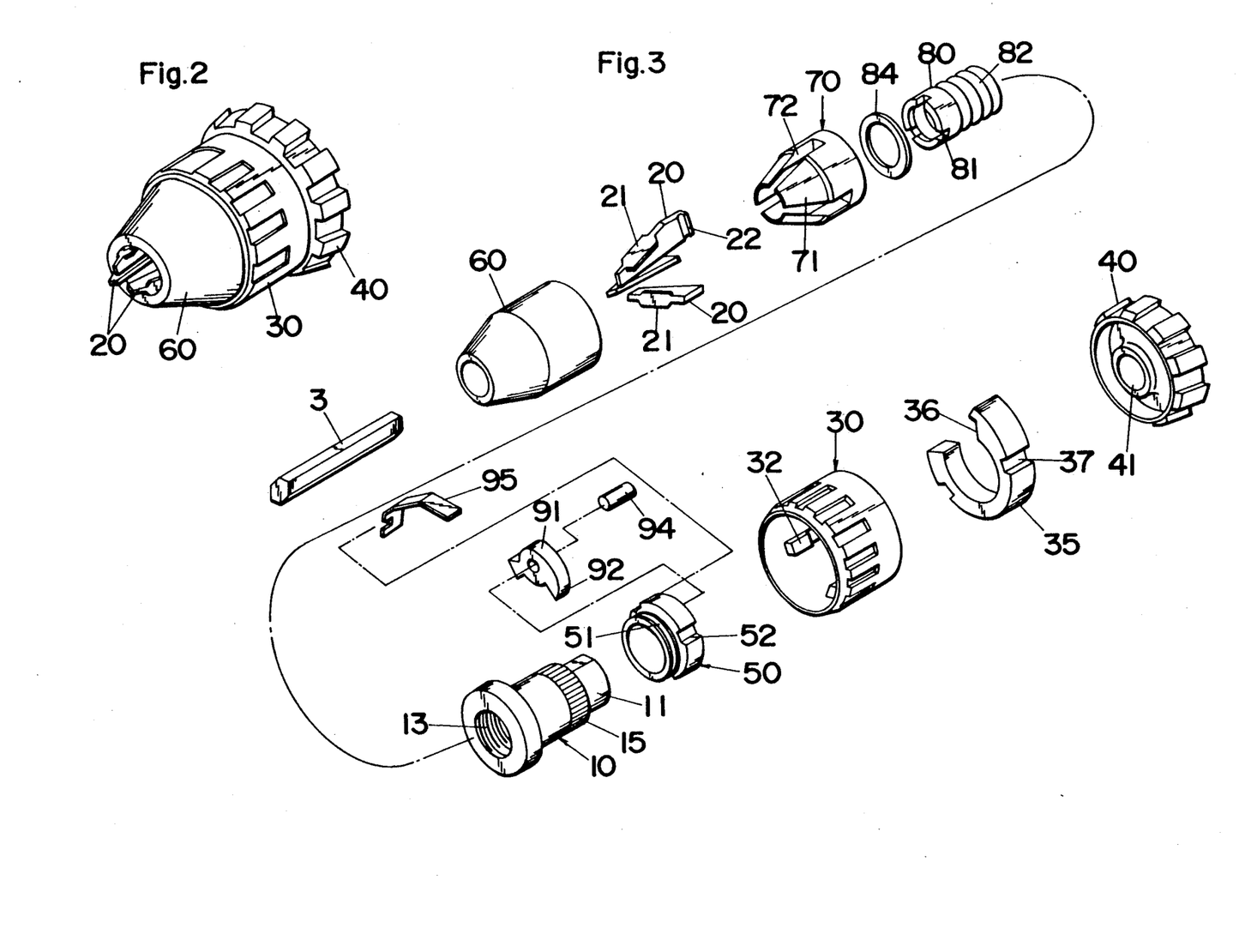
FIG. 2 is a perspective view of the chuck.
FIG. 3 is an exploded perspective view of the chuck.

A plastic made grip ring 40 with a knurled surface is fixed around the coupling boss 11 With the coupling boss 11 inserted into a correspondingly shaped non-circular socket 41 in the grip ring 40 so that the grip ring 40 is rotatable with the chuck body 10. Disposed around the chuck body 10 interiorly of the handle ring 30 is a sleeve ring 50 which is rotatable in either direCtion relative to the chuck body 10 and is generally rotatable together with the handle ring 30. The sleeve ring 50 is operatively connected to the gripping jaws 20 through a nose piece 60, a jaw carrier 70, and a floating collet 80 for tightening and loosening the gripping jaws 20 upon being rotated relative to the chuck body 10.

The nose piece 60 is coupled at its rear end to a front threaded end 51 of the sleeve ring 50 with the jaw carrier 70 held between the front conical section of the nose piece 60 and the sleeve ring 50 so that these three members are togetherly rotatable as one rotating unit. The jaw carrier 70 is formed in its front cone 71 with a corresponding number of axially extending slots 72 in which the gripping jaws 20 are slidably received respectively with a pad 21 of each gripping jaw 20 slidably supported on the exterior of the front cone 71. The rear end of each gripping jaw 20 is formed with a L-shaped hook 22 which extends through the interior of the jaw carrier 70 into engagement with each of nicks 81 in the front end of the floating collet 80 for connection of the gripping jaws 20 to the collet 80 both in axial and rotational directions. The floating collet 80 has its external thread 82 engaged with the internal thread 13 of the chuck body 10 in reversely threaded engagement fashion such that when the chuck body 10 is driven to rotate in a forward direction F the collet 80 advances in the axial direction as being rotated in the opposite direction to the chuck body 10. Whereby the gripping jaws 20 on the jaw carrier 70 are urged against the inner conical surface of the nose piece 60 to move radially inwardly into a gripping engagement on the tool bit 3. On the other hand, when the chuck body 10 rotates in the reverse direction R relative to the sleeve ring 50, the floating collet 80 is caused to move axially rearwardly to thereby displace the gripping jaws 20 radially outwardly for loosening the same. A stop ring 84 is provided on the front end of the floating collet 80 to limit the rearward movement thereof by abutment with the front end of the chuck body 10.

Figure 5:
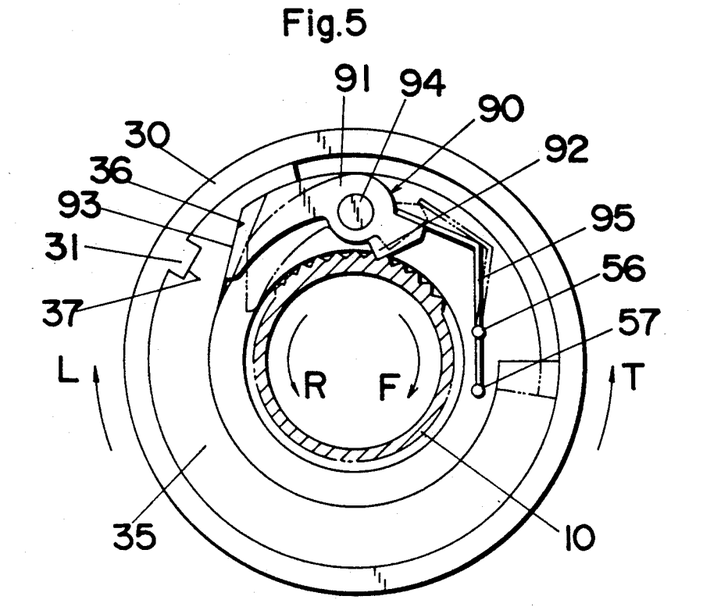
FIG. 5 is a sectional view taken along line 5—5 of FIG. 5.
Figure 6:
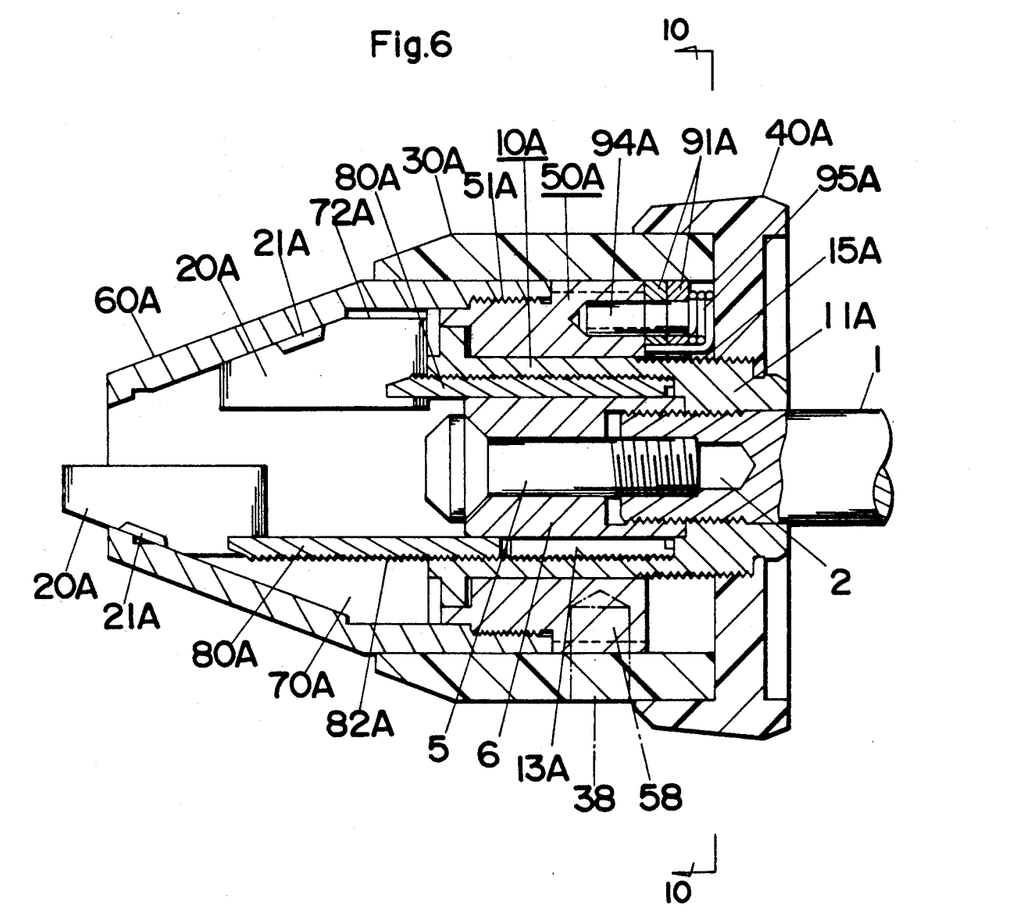
FIG. 6 is a sectional view of a keyless chuck, with gripping jaws shown in advanced and retreated positions respectively in the upper and lower sections, in accordance with a second embodiment of the present invention.
Figure 7:
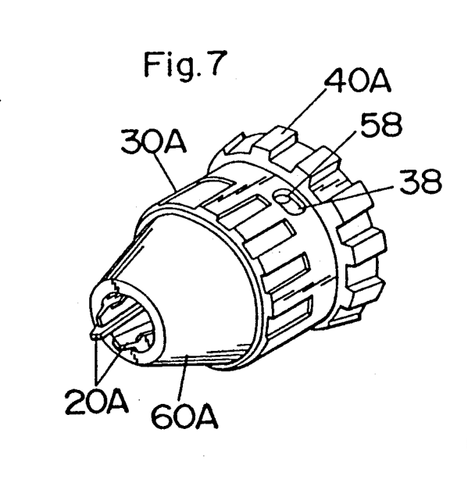
FIG. 7 is a perspective view of the chuck of FIG. 6.

As discussed in the above, the handle ring 30 is generally rotatable together with the sleeve ring 50 relative to the chuck body 10 such that, when it is intended to tighten the gripping jaws 20 on the tool bit 3, the handle ring 30 is rotated in the counter clockwise direction relative to the chuck body 10, as viewed from the rear of the chuck, or the direction indicated by T in FIG. 5. Thus, the floating collet 80 is caused to advance axially forward from the chuck body 10 as rotating relative thereto, thereby displacing the gripping jaws 20 to move radially inwardly into tool-gripping engagement with the tool bit 3. Such tightening of the gripping jaws 20 can be easily made by driving the chuck body 10 to rotate in the forward direction F while holding the handle ring 30 stationary by one hand of a user. Thus, by utilization of the rotary energy of the power tool, the gripping jaws 20 can be readily and quickly self-tightened on the tool bit 3. For loosening the gripping jaws 20, the handle ring 30 is rotated relative to the chuck body 10 in the opposite direction L, as indicated also in FIG. 5, or the chuck body 10 is rotated in the reverse direction R While the handle ring 30 held stationary. It is noted in this connection that the grip ring 40 is utilized to hold the chuck body 10 in position while manipulating the handle ring 30 to rotate thereabout, facilitating the hand operation of tightening and loosening the gripping jaws 20 where the power tool energy is not available. The handle ring 30 is made of a plastic material and has a knurled surface for easy grip.

A one-way clutch 90 is provided between the sleeve ring 50 and the chuck body 10 in order to prevent the sleeve ring 50, or the handle ring 30 from being caused to counter-rotate in the direction L of loosening the gripping jaws 20 when the chuck body 10 is driven to rotate in the reverse direction R in order to turn the tool bit 3 reversely. That is, the clutch 90 acts to rotatively fix the chuck body 10 to the sleeve ring 50 or the handle ring 30 when the chuck body 10 rotates in the reverse direction R, but to allow the chuck body 10 to rotate freely independently of the sleeve ring 50 (or the handle ring 30) in the forward direction F for tightening the gripping jaws 20. After the gripping jaws 20 are tightened on the tool bit 3, the gripping jaws 20 are caused to rotate together with the chuck body 10 for turning the tool bit 3 forwardly.

Figure 4:
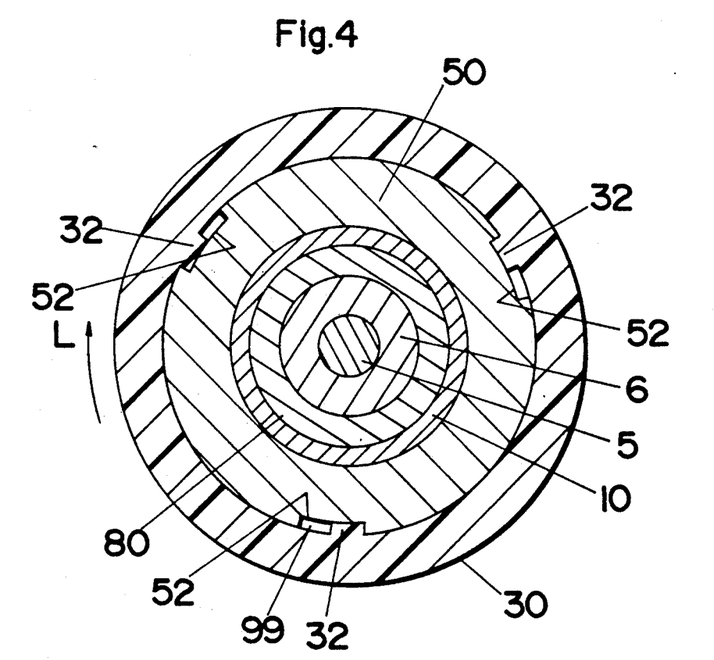
FIG. 4 is a sectional view taken along line 4—4 of FIG. 1.

As shown in FIGS. 1 and 5, the clutch 90 comprises a pawl 91 pivotally supported on the sleeve ring about a pivot pin 94 extending in parallel with the longitudinal axis of the chuck with its one end inserted in the rear end of the sleeve ring 50 and with the other end abutted against the grip ring 40. The pawl 91 is urged by a spring 95 also supported on the sleeve ring 50 at 56 and 57 so that a finger 92 at one end of the pawl 91 is biased into engagement with ratchet teeth 15 formed around the chuck body 10 forwardly of the coupling boss 11. The other end of the pawl 91 forms an inclined edge 93 in constant abutment with a correspondingly inclined cam end 36 of an internal split ring 35. The internal ring 35 extends interiorly of the handle ring 30 and is rotatively fixed thereto with an inward projection 32 of the handle ring 30 snugly inserted into a corresponding recess 37 in the internal ring 35. It is noted at this time that, as shown in FIG. 4, the handle ring 30 is coupled to the sleeve ring 50 with its inward projecting studs 32 extending into circumferentially elongated notches 52 in the outer periphery of the sleeve ring 50 so that the handle ring 30 is rotatable relative to the sleeve ring 50 within a limited extent or play defined by the gap 99 between the stud 32 and the corresponding notch 52. Due to the spring bias acting on the pawl 91 and then on the internal ring 35, the handle ring 30 is normally held in a position as shown in FIG. 4 where the studs 32 are each offset to one circumferential end of the notch 52.

The clutch 90 thus constructed can be released by rotating the handle ring 30 in the direction L, as indicated in FIGS. 4 and 5, relative to the sleeve ring 50 within such gap 99. In response to the handle ring 30 being rotated, the internal ring 35 rotates togetherly to push at the cam end 36 radially inwardly the inclined edge 93, thereby causing the pawl 91 to pivot in the direction of disengaging it from the ratchet teeth 15 against the bias of the spring 95. Once the clutch is released, a continued rotation of the handle ring 30 will make the sleeve ring 50 to rotate together relative to the chuck body 10 whereby enabling the loosening of the gripping jaws 20. Thus, the tool bit 3 can be readily removed from the chuck simply by manipulating the handle ring 30 to rotate in one direction relative to the chuck body 10. When the rotary energy of a power tool is available, the clutch release and the subsequent loosening can be easily made simply by holding the handle ring 30 while driving the chuck body 10 to rotate in the reverse direction R.

Second embodiment <FIGS. 6 to 11>

Figure 10:
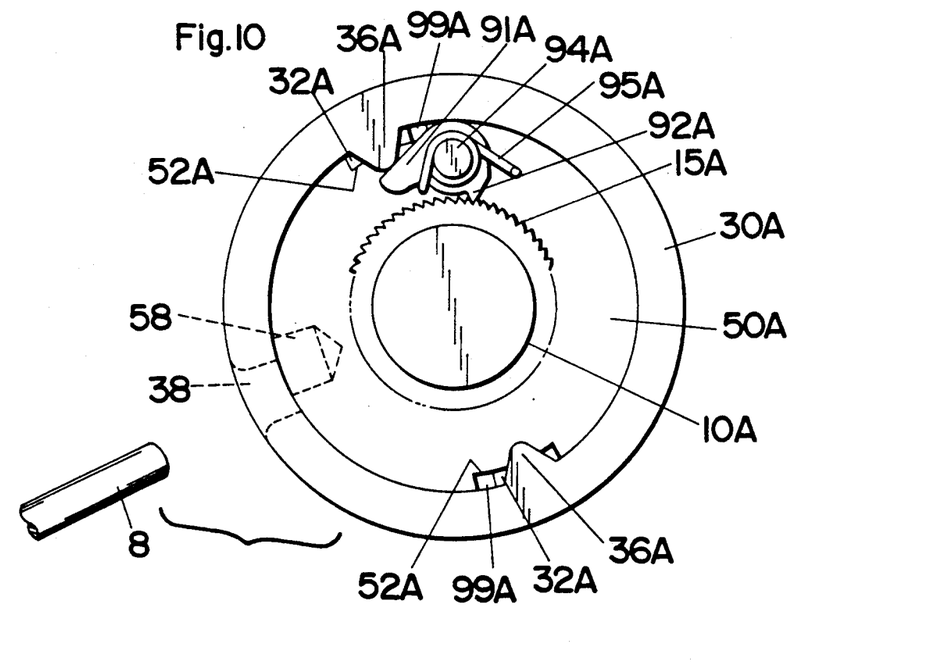
FIG. 10 is a sectional view taken along line 10—10 of FIG. 6.
Figure 11A:
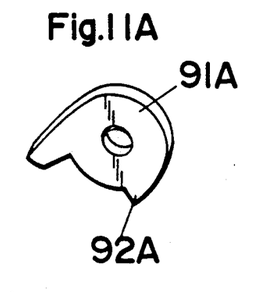
FIG. 11A and 11B are views respectively illustrating pawls utilized as forming the clutch of the chuck.
Figure 11B:
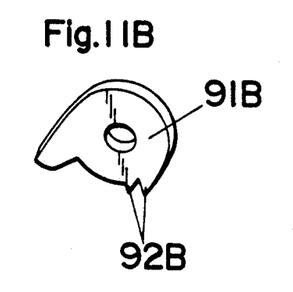

In accordance with a second embodiment of the present invention, there is shown a chuck which is similar in construction and operation to the first embodiment. The like parts are designated by the same numerals with a suffix letter of A. According to this embodiment, the clutch comprises two pawls 91A which are pivoted about a pivot pin 94A and urged by a torsion spring 95A into one-way locking engagement with the ratchet teeth 15A likewise formed around the chuck body 10A. The torsion spring 95A is wound around the pivot pin 94A with one end secured to the sleeve ring 50A and the other end hooked on the pawls 91A. As shown in FIG. 10, the handle ring 30A is coupled to the sleeve ring 50A with its inwardly projecting studs 32A engaged into circumferentially elongated notches 52A in the sleeve ring 50A so that the handle ring 30A is rotatable relative to the sleeve ring 50A within a limited extent or gap 99 defined between the stud 32A and the notch 52A, in the like manner as in the above first embodiment. The handle ring 30A is formed in on its inner surface with integral cam projections 36A one of which is in constant abutment with one end of each pawl 91A so as to pivot it out of locking engagement from the ratchet teeth 15A against the bias of the torsion spring 95A when the handle ring 30A is rotated in the direction L, in FIG. 10, relative to the chuck body 10A within the gap 99, effecting the like loosening of the chuck in the like manner as in the above first embodiment. Although this embodiment utilizes the pawl 91A having a single finger, as shown in FIG. 11A, for engagement with the ratchet tooth 15A, a pawl 91B having double fingers 92B, as shown in FIG. 11B, may be utilized when a still firm locking engagement is required between the sleeve ring and the chuck body. Further, it may be possible to provide an additional clutch, for example, in diametrically opposed relation with the clutch shown in FIG. 10. Also in the second embodiment, the rachet teeth 15A are formed to extend rearwardly over the coupling boss 11A of a circular configuration for toothed engagement with the grip ring 40A, thus ensuring to rotatively fix the grip ring 40A to the chuck body 10A.

Figure 8:
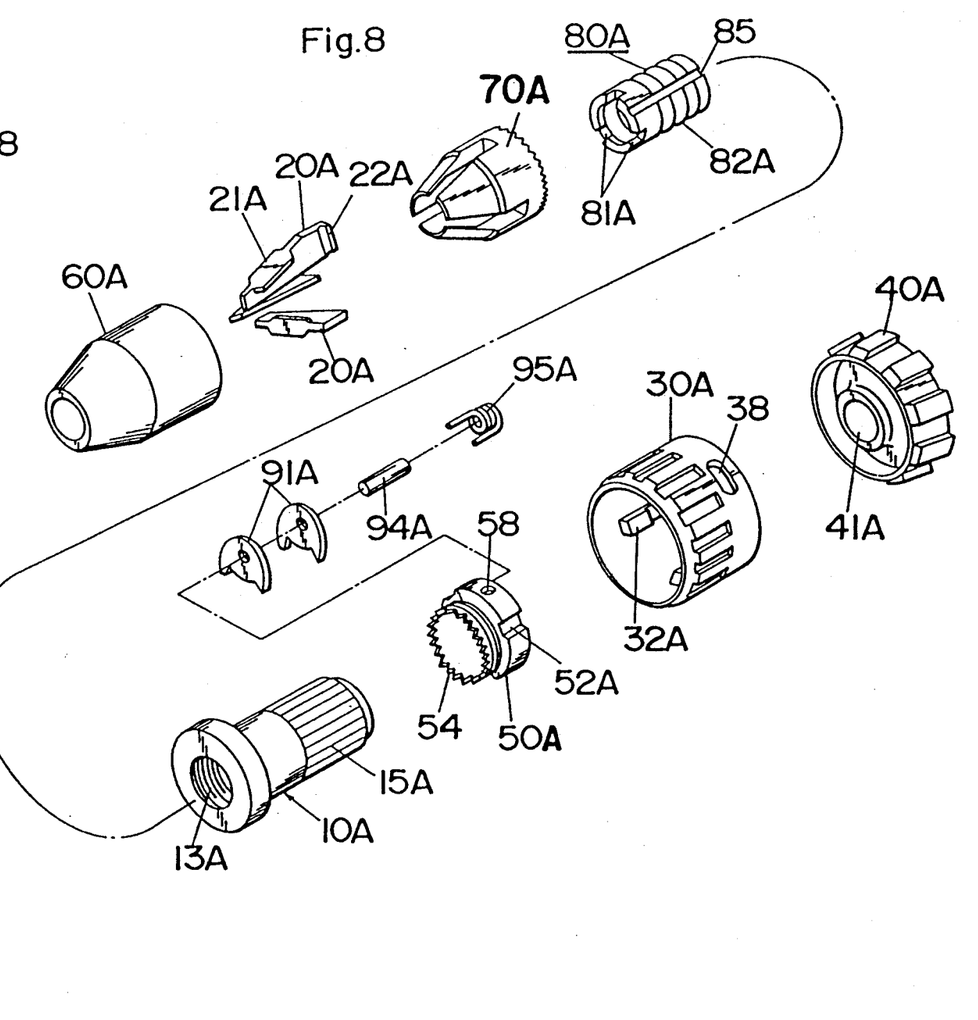
FIG. 8 is an exploded perspective view of the chuck.
Figure 9:
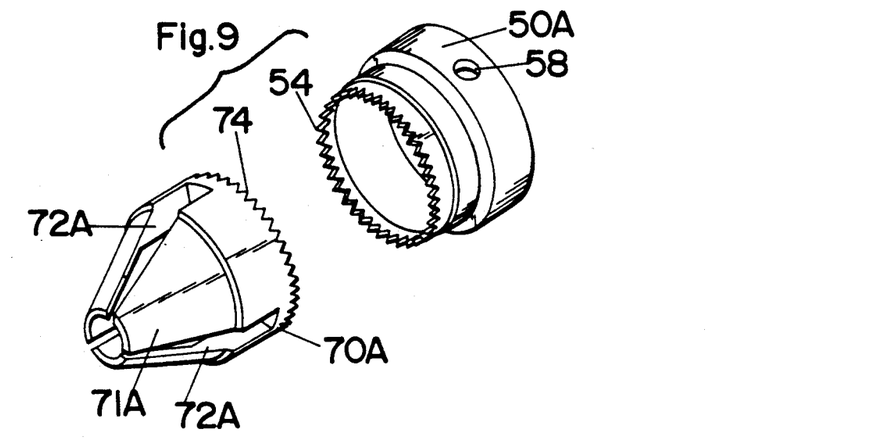
FIG. 9 is an exploded perspective view of a sleeve ring and a jaw carrier utilized in the chuck.

As shown in FIG. 9, the sleeve ring 50A has a serrated front edge 54 for secure engagement with a corresponding serration 74 formed in the rear end of the jaw carrier 70A for enhanced coupling connection therebetween. Likewise in the first embodiment, the nose piece 60A are threaded at its rear end to the front end of the sleeve ring 50A with the jaw carrier 70A held therebetween in the axial direction so that sleeve ring 50A, jaw carrier 70A, and nose piece 60A are rotatable as one rotating unit. As shown in FIG. 8, the floating collet 80A is preferred to have at least one axial groove 85 on its outer surface such that any scraps or the like foreign matter entering between the chuck body 10A and the collet 80A can be readily excluded along the groove 85 from the threaded connection therebetween, well preventing a jamming of the collet 80A and therefore assuring a smooth rotation of the collet 80A relative to the chuck body 10A.

The handle ring 30A is formed with a circumferentially elongated window 38 into a portion of which is exposed a key hole 58 formed in the sleeve ring 50A. The key hole 58 is provided to receive a key 8 through the window 38 for tightening or loosening the chuck where an extra force is required for rotating the sleeve ring 50A relative to the chuck body 10A. The window 38 is circumferentially elongated in order to prevent the handle ring 30A of plastic material from being subjected to excess forces from the key 8 when tightening or loosening the chuck, and therefore preventing the handle ring 30A from being damaged thereby.

What is claimed is:

1. A chuck for a rotary tool comprising:

a chuck body having a longitudinal axis and connected to a drive spindle of a drive source for driving said chuck body about said axis;

a jaw unit comprising a set of gripping jaws and means convergingly guiding the jaws for clamping a tool bit to be rotated by said chuck body;

a sleeve ring disposed around said chuck body and being relatively rotatable with respect to said chuck body, means for displacing said gripping jaws into tool-gripping relation with the tool bit when said chuck body is rotated relative to said sleeve ring in one direction and displacing said gripping jaws out of tool-gripping relation from the tool bit when said chuck body is rotated in an opposite direction relative to said sleeve ring;

one-way clutch means for releasably engaging said sleeve ring to said chuck body when said chuck body is driven to rotate in said opposite direction such that said sleeve ring rotates together with said chuck body without loosening said gripping jaws and for allowing said chuck body to rotate independently of said sleeve ring in said one direction until said gripping jaws tighten on said tool bit, said one-way clutch means further includes (a) ratchet teeth formed on said chuck body for locking said sleeve ring to said chuck body, and (b) a pawl supported for pivotal movement about a pivot seated in said sleeve ring and biased by a spring into engagement with said ratchet teeth; and a handle ring disposed around said sleeve ring and rotatably coupled thereto with a certain amount of play therebetween corresponding to a limited extent, said handle ring having a cam end which is movable into abutment with one end of said pawl to move said pawl out of engagement with said ratchet teeth when said handle ring is caused to rotate within said limited extent relative to said sleeve ring in said one direction against the bias of said spring, said chuck body being freely rotatable relative to said handle ring and sleeve ring in said opposite direction when said one-way clutch is disengaged from said chuck body thereby allowing said drive source to loosen said gripping jaws for removal of the tool bit therefrom by rotating said body in said opposite direction.

2. A chuck for a rotary tool as set forth in claim 1; wherein said handle ring is formed around its interior circumference with a split ring forming said cam end at its one open end.

3. A chuck for a rotary tool as set forth in claim 1, wherein said handle ring is formed on its interior surface with a projection defining said cam end.

4. A chuck for a rotary tool as set forth in claim 1, wherein said pivotally supported pawl is pivotally supported on a pivot pin seated in and projecting from an end face of said sleeve ring and extending parallel to said longitudinal axis of said chuck body, said handle ring extends rearwardly beyond said face of said sleeve ring and defines a space between said handle ring and said chuck body for receiving said pivot pin, said pawl and said spring, and said cam end of said handle ring is comprised of a cam formed on an interior surface of said handle ring.

5. A chuck for a rotary tool as set forth in claim 4, wherein said spring is a torsion spring fitted around said pivot axis of said pawl to bias it into engagement with said ratchet teeth of said chuck body.

* * * * *